US012756709B1

(12) United States Patent
Wood et al.

(10) Patent No.: US 12,756,709 B1
(45) Date of Patent: Oct. 6, 2026

(54) VEHICLE DATA COMMUNICATION MANAGEMENT BASED ON MULTI-PART NETWORK INTERACTIONS

(71) Applicant: Tesla, Inc., Austin, TX (US)

(72) Inventors: Ming Wood, Campbell, CA (US); Harsha Laxman, Dublin (NL); Robert J. Forloine, San Francisco, CA (US); Stephen Nees, Irvine, CA (US)

(73) Assignee: Tesla, Inc., Austin, TX (US)

( * ) Notice: Subject to any disclaimer, the term of this patent is extended or adjusted under 35 U.S.C. 154(b) by 535 days.

(21) Appl. No.: 17/823,920

(22) Filed: Aug. 31, 2022

Related U.S. Application Data

(60) Provisional application No. 63/239,354, filed on Aug. 31, 2021.

(51) Int. Cl.

*H04L 9/40* (2022.01)
*G06F 13/362* (2006.01)
*G06F 21/62* (2013.01)
*G06Q 10/20* (2023.01)
*G07C 5/08* (2006.01)

(52) U.S. Cl.

CPC .............. *H04L 63/10* (2013.01); *G07C 5/085* (2013.01); *G06F 13/362* (2013.01); *G06F 21/62* (2013.01); *G06Q 10/20* (2013.01)

(58) Field of Classification Search

CPC ..... H04L 63/10; H04L 63/0892; H04L 51/04; H04L 51/216; G06Q 10/20; B60R 25/24; G06F 13/362; G06F 21/62; H04B 3/548

See application file for complete search history.

(56) References Cited

U.S. PATENT DOCUMENTS 8,935,804 B1 * 1/2015 Clark .................... G06F 16/954 726/1
11,303,632 B1 * 4/2022 Mannattil ............ G06V 40/172
2002/0073012 A1 * 6/2002 Lowell ............... G06Q 30/0601 705/26.1
2006/0225129 A1 * 10/2006 Inoue ...................... H04L 63/08 726/3
2014/0297097 A1 * 10/2014 Hurwitz ............... G07C 5/0858 701/31.4
2017/0136894 A1 * 5/2017 Ricci ....................... B60L 53/65
2018/0077099 A1 * 3/2018 Silva ...................... H04L 65/403
2018/0126952 A1 * 5/2018 Niemiec .............. G07C 5/0808
2018/0186333 A1 * 7/2018 Santiano ............... H04W 12/08

(Continued)

*Primary Examiner* — William R Korzuch
*Assistant Examiner* — Aditya Sriram
(74) *Attorney, Agent, or Firm* — Knobbe, Martens, Olson & Bear, LLP

(57) ABSTRACT

One or more aspects of the present disclosure relate to the configuration and management of data communications associated with a vehicle. By way of illustrative example, aspects of the present application correspond to management of data communications to obtain data generated or collected by a vehicle (e.g., “vehicle data”), which can include, but is not limited to, logs of information previously collected or generated by sensor and processing components, current vehicle data, or third-party data collected by the vehicle, and the like. In another illustrative examples, aspects of the present application correspond to management of data communications to provide configuration data or executable code to a vehicle, such as diagnostic applications, repair applications, and the like.

17 Claims, 14 Drawing Sheets

(56) References Cited

U.S. PATENT DOCUMENTS

| | | | | |
|---|---|---|---|---|
| 2019/0178664 | A1* | 6/2019 | Dudar | G01C 22/00 |
| 2019/0322231 | A1* | 10/2019 | Möller | G07C 5/008 |
| 2021/0256163 | A1* | 8/2021 | Fleming | G06F 21/6272 |
| 2021/0409412 | A1* | 12/2021 | Mohamed | H04L 51/224 |
| 2022/0019980 | A1* | 1/2022 | Rogers | G06Q 20/0855 |
| 2022/0391789 | A1* | 12/2022 | Patterson | G06Q 10/20 |

* cited by examiner

VEHICLE DATA COMMUNICATION MANAGEMENT BASED ON MULTI-PART NETWORK INTERACTIONS

CROSS-REFERENCE TO RELATED APPLICATIONS

This application claims prior to U.S. Provisional Application 63/239,354 entitled VEHICLE DATA COMMUNICATION MANAGEMENT BASED ON MULTI-PART NETWORK INTERACTIONS on Aug. 31, 2021. U.S. Provisional Application 63/239,354 is incorporated by reference in its entire herein

BACKGROUND

Generally described, computing devices and communication networks can be utilized to exchange data and/or information. In a common application, a computing device can request content from another computing device via the communication network. For example, a user at a personal computing device can utilize a browser application to request a content page (e.g., a network page, a Web page, etc.) from a server computing device via the network (e.g., the Internet). In such embodiments, the user computing device can be referred to as a client computing device and the server computing device can be referred to as a content provider. In another embodiment, the user computing device can collect or generate information and provide the collected information to a server computing device for further processing or analysis.

Generally described, a variety of vehicles, such as electric vehicles, combustion engine vehicles, hybrid vehicles, etc., can be configured with various sensors and components to facilitate operation. In certain scenarios, a vehicle owner or vehicle user may require a service technician to be provided access to at least a portion of data generated or otherwise collected by a vehicle. Typically, access to vehicle information can be limited to providing technicians access to vehicle data only when the vehicle and one or more technicians are physically proximate, such as a technician being able to access vehicle data via a physical connection to the vehicle.

BRIEF DESCRIPTION OF THE DRAWINGS

This disclosure is described herein with reference to drawings of certain embodiments, which are intended to illustrate, but not to limit, the present disclosure. It is to be understood that the accompanying drawings, which are incorporated in and constitute a part of this specification, are for the purpose of illustrating concepts disclosed herein and may not be to scale.

DETAILED DESCRIPTION

Figure 1:
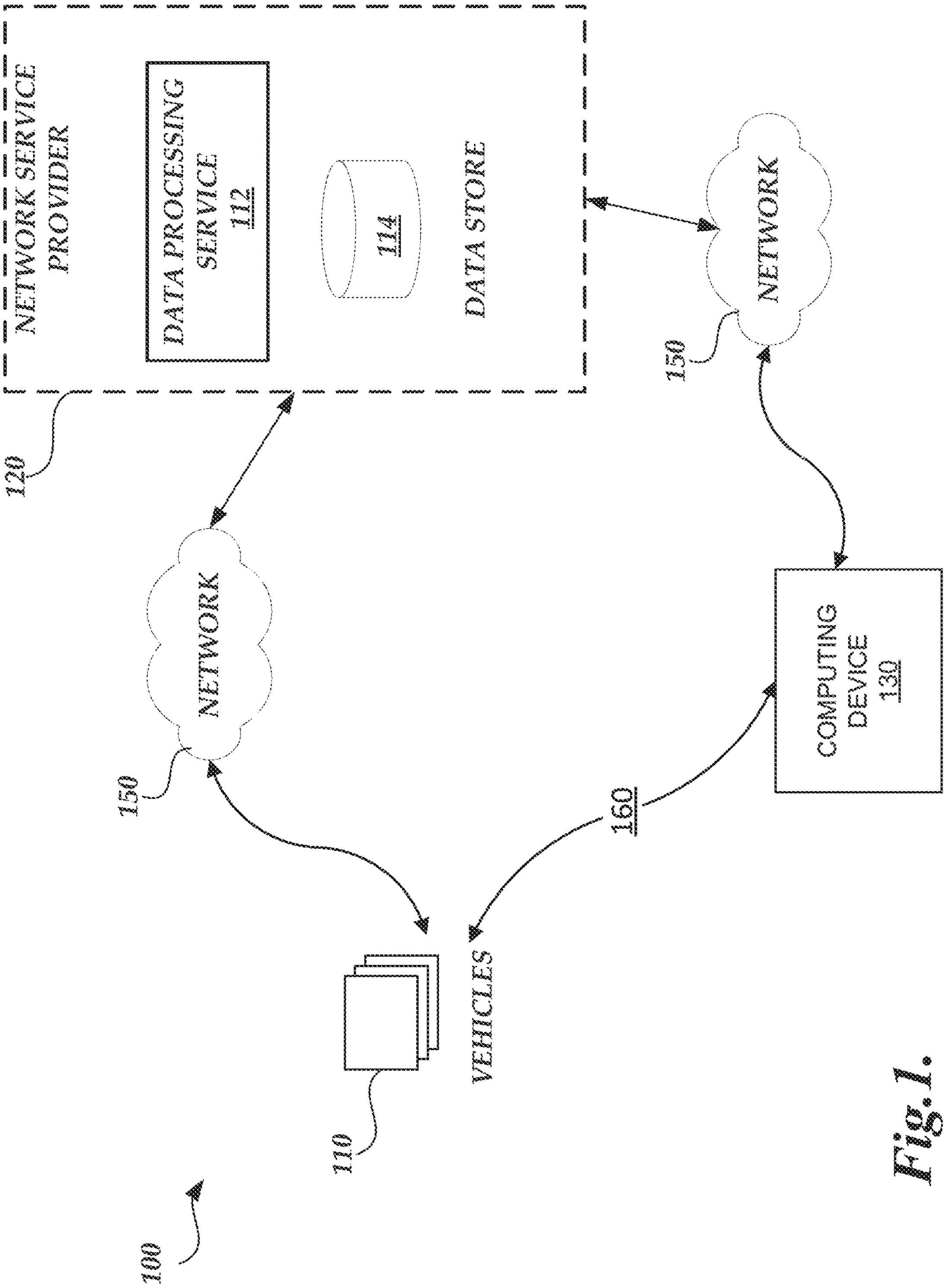
FIG. 1 depicts a block diagram of an illustrative environment for providing a vehicle data communication access in accordance with one or more aspects of the present application.

Generally described, one or more aspects of the present disclosure relate to the configuration and management of data communications associated with a vehicle. By way of illustrative example, aspects of the present application correspond to management of data communications to obtain data generated or collected by a vehicle (e.g., "vehicle data"), which can include, but is not limited to, logs of information previously collected or generated by sensor and processing components, current vehicle data, or third-party data collected by the vehicle, and the like. In another illustrative examples, aspects of the present application correspond to management of data communications to provide configuration data or executable code to a vehicle, such as diagnostic applications, repair applications, and the like.

In accordance with an illustrative embodiment, one or more aspects of the present application relate to the management and accessibility of vehicle data communications provided to an authenticated and authorized user, such as a service technician or other third party. Illustratively, a network service provider facilitates the interaction between the vehicle owner/user and the third party accessing the respective vehicle data. The network service provider can facilitate an initial authorization for access to vehicle data, provide access to the vehicle data for authenticated and authorized users, and manage revocation of vehicle data access rights.

In some embodiments, the information provided by the components can include processed information in which a controller, logic unit, processor, and the like has processed sensor information and generated additional information, such as a vision system that can utilize inputs from one or more camera sensors and provide outputs corresponding to identification of environmental conditions that promote accumulation of objects/obstructions on the fascia (e.g., a processing of raw camera image data and the generation of outputs corresponding to the processing of the raw camera image information). The camera sensor may be the sensor component that is associated with the heater element. In other embodiments, the camera sensors can be separate from the sensor components, such as for non-camera sensor components or vehicles having multiple camera sensors. In still another example, a control component can utilize additional information obtained from, or otherwise associated with, positioning systems, calendaring systems, or time-based systems. In still a further example, the historical information can be incorporated as a separate information source to the control component or be utilized to process at least some portion of the set of information sources, such as detected vehicle speed, external temperature measurements, and operational status of the windshield wiper, vision system (e.g., camera inputs), location systems (e.g., GPS systems), timing information, operational status of the radar components, etc.

As previously described, traditional approaches to data communication management between a vehicle and a third-party technician is defined according to physical proximity between the vehicle and the technician. For example, a customer tenders a vehicle to a service center that provides the technician with physical access to the vehicle. In this regard, the granting of client authorization to a technician with regard to access to vehicle data or to provide data to the vehicle is inferred by the physical tender of the vehicle. This may result in a customer/client being required to provide physical access to the vehicle for longer periods of time as access to vehicle data does not occur until the physical tender of the vehicle. Additionally, typically a customer has no mechanism to define or otherwise limit the type of vehicle data that individual technicians or groups of technicians have access to or otherwise revoke access once the vehicle is tendered.

To address at least a portion of the above-identified inefficiencies, a network service provider can facilitate the authentication and authorization of data communications between a vehicle and one or more third-parties, generally referred to as technicians. The network service provider can authenticate the technicians in a manner that allows the network service provider to manage access for the technicians. Illustratively, the authentication can be managed by the utilization of tokens or other unique identifiers that correspond to authenticated technicians. The network service provider can also authorize authenticated technicians based on interactions with a customer that permit the establishment of a data communication channel between the vehicle and a technician(s) and optionally configure one or more aspects of the data communication via the established communication channel. The network service provider can actively manage the communication channel to revoke the authorization rights of individual technicians or modify any previous configurations of the data communications.

Illustratively, by utilization of a network service provider, third-parties can establish data communications with a vehicle without requiring physical proximity to a vehicle. This may allow a third party, such as a technician, to obtain vehicle data to facilitate diagnosis of vehicle performance, identification of potential issues, advanced ordering of parts, and the like. The data communications can also allow the third parties to cause the vehicle to execute executable code or configurations that facilitate diagnostics, repairs, updates, upgrades and the like. Still further, customers can control one or more attributes of the data communication channels including duration of access, type of access, restrictions and the like.

Although the various aspects will be described in accordance with illustrative embodiments and combination of features, one skilled in the relevant art will appreciate that the examples and combination of features are illustrative in nature and should not be construed as limiting. More specifically, aspects of the present application may be applicable with various types of vehicle data or vehicle processes. However, one skilled in the relevant art will appreciate that the aspects of the present application are not necessarily limited to application to any particular type of vehicle data, data communications or illustrative interaction between third parties, customer and a network service provider.

FIG. 1 depicts a block diagram of an illustrative environment 100 for providing a vehicle data communication access in accordance with one or more aspects of the present application. The system 100 can comprise a network, the network connecting a set of vehicles 110, a network service provider 120, and one or more computing devices 130. The components may correspond to software modules implemented or executed by one or more external computing devices, which may be separate stand-alone external computing devices. Accordingly, the components of the network service provider 120 should be considered as a logical representation of the service, not requiring any specific implementation on one or more external computing devices.

The computing device 130, as depicted in FIG. 1, can be any computing device such as a desktop, laptop, personal computer, tablet computer, wearable computer, server, personal digital assistant (PDA), hybrid PDA/mobile phone, mobile phone, smartphone, set-top box, voice command device, digital media player, and the like. The computing device 130 may execute an application (e.g., a browser, a stand-alone application, etc.) that allows a user to access interactive user interfaces, view images, analyses, aggregated data, and/or the like as described herein. By way of illustrative embodiment, the computing device 130 corresponds to a computing device that is utilized by a service technician, generally referred to as a technician computing device. As will be described, the technician computing device (or generally computing device 130) can request access to vehicle data as described herein.

Network 150, as depicted in FIG. 1, connects the vehicles 110, computing devices, 130, and network service provider 120. The network 150 can connect any number of devices. In some embodiments, the network service provider 120 provides network-based services to computing devices via a network. A network service provider implements network-based services and refers to a large, shared pool of network-accessible computing resources (such as compute, storage, or networking resources, applications, or services), which may be virtualized or bare-metal. The network service provider can provide on-demand network access to a shared pool of configurable computing resources that can be programmatically provisioned and released in response to customer commands. These resources can be dynamically provisioned and reconfigured to adjust to the variable load. The concept of "cloud computing" or "network-based computing" can thus be considered as both the applications delivered as services over the network and the hardware and software in the network service provider that provide those services.

A network 160 can comprise any combination of wired and/or wireless networks, such as one or more direct communication channels, local area network, wide area network, personal area network, and/or the Internet, for example. In some embodiments, communication between the vehicle 110 and the computing device 130 may be performed via a short-range communication protocol, such as Bluetooth, Bluetooth low energy ("BLE"), and/or near field communications ("NFC"). Communication between the vehicle 110 and the network service provider 120 can occur via network 150, such as via one or more secured networks, such as a local area network that communicates securely via the Internet with the network service provider 120. However, networks 150, 160 may include some or all of the same communication protocols, services, hardware, etc. Thus, although the discussion herein may describe communication between the vehicle 110 and the computing device 130 via the network 160 and communication between the vehicle 110 and the network service provider 120 via the network 150, communications of the devices are not limited in this manner. The various communication protocols discussed herein are merely examples, and the present application is not limited thereto.

Illustratively, the set of vehicles 110 correspond to one or more vehicles configured with data storage for storing data generated from electrical components in the vehicle 110. The data, for example, can include log data generated from sensors installed in the vehicle, any processed data related to the vehicle operation such as engine oil data, coolant temperature, milage, oxygen, knocking information from various sensors, etc. The data can also include diagnosed data, an automated driving (e.g., self-driving) related data. In one embodiment, the data can be received from an external device. By way of illustration, the vehicles 110 can include computing devices that be considered to be integrated or form a par to the vehicle. In other embodiments, customers may also have additional computing devices, such as mobile devices, that will be considered to be associated with the vehicle, including mobile devices tethered to or in close proximity to a vehicle. For purposes of the present application, a customer computing device will be generally interpreted each of these embodiments, and variations thereof.

Illustratively, the network service provider 120 can include a vehicle data access service 112 that can provide functionality responsive to authenticating technicians as applied to aspects of the present application. The network service provider 120 can include one or more data stores for storing vehicle diagnostic results associated with aspects of the present application. The vehicle data access service 112 and data store 114 in FIG. 1 are logical in nature and can be implemented in the network service provider 120 in a variety of manners.

Figure 2:
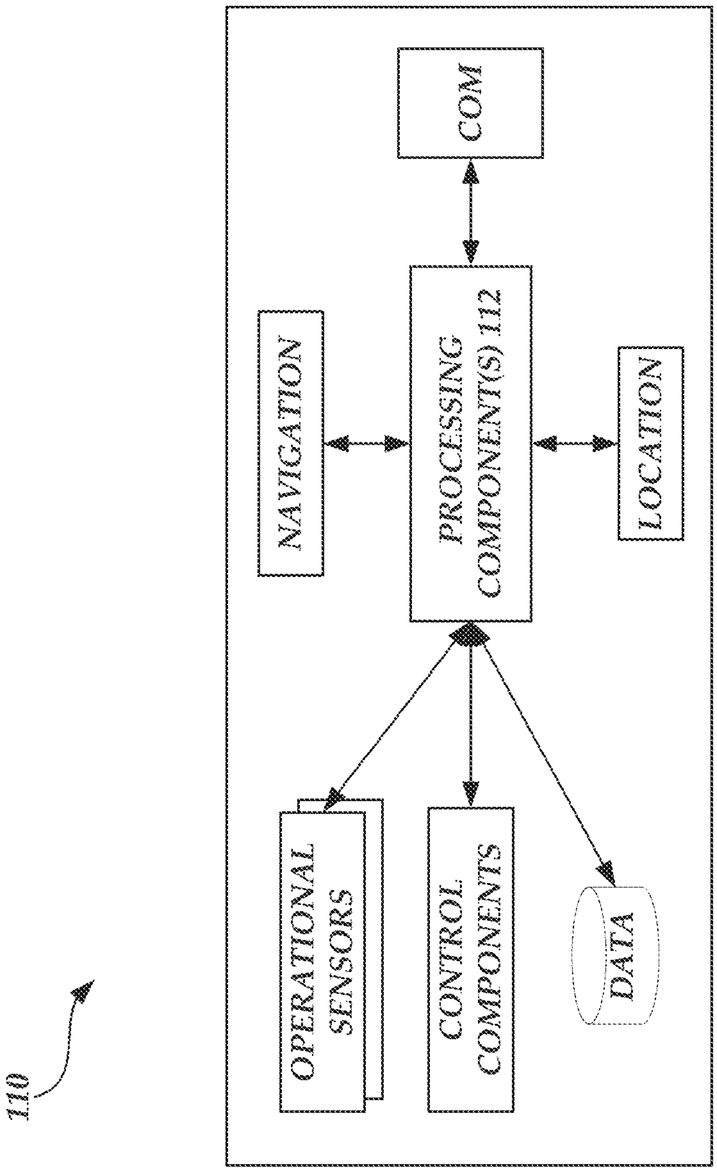
FIG. 2 illustrates an environment that corresponds to vehicles in accordance with one or more aspects of the present application.

For purposes of illustration, FIG. 2 illustrates an environment that corresponds to vehicles 110 in accordance with one or more aspects of the present application. The environment includes a collection of local sensor inputs that can provide inputs for the operation of the vehicle or collection of information as described herein. The collection of local sensors can include one or more sensor or sensor-based systems included with a vehicle or otherwise accessible by a vehicle during operation. The local sensors or sensor systems may be integrated into the vehicle. Alternatively, the local sensors or sensor systems may be provided by interfaces associated with a vehicle, such as physical connections, wireless connections, or a combination thereof.

In one aspect, the local sensors can include vision systems that provide inputs to the vehicle, such as detection of objects, attributes of detected objects (e.g., position, velocity, acceleration), presence of environment conditions (e.g., snow, rain, ice, fog, smoke, etc.), and the like. In some embodiments, vehicles 110 can rely on such vision systems for defined vehicle operational functions without assistance from or in place of other traditional detection systems.

In yet another aspect, the local sensors can include one or more positioning systems that can obtain reference information from external sources that allow for various levels of accuracy in determining positioning information for a vehicle. For example, the positioning systems can include various hardware and software components for processing information from GPS sources, Wireless Local Area Networks (WLAN) access point information sources, Bluetooth information sources, radio-frequency identification (RFID) sources, and the like. In some embodiments, the positioning systems can obtain combinations of information from multiple sources. Illustratively, the positioning systems can obtain information from various input sources and determine positioning information for a vehicle, specifically elevation at a current location. In other embodiments, the positioning systems can also determine travel-related operational parameters, such as direction of travel, velocity, acceleration, and the like. The positioning system may be configured as part of a vehicle for multiple purposes including self-driving applications, enhanced driving or user-assisted navigation, and the like. Illustratively, the positioning systems can include processing components and data that facilitate the identification of various vehicle parameters or process information.

In still another aspect, the local sensors can include one or more navigations system for identifying navigation related information. Illustratively, the navigation systems can obtain positioning information from positioning systems and identify characteristics or information about the identified location, such as elevation, road grade, etc. The navigation systems can also identify suggested or intended lane location in a multi-lane road based on directions that are being provided or anticipated for a vehicle user. Similar to the location systems, the navigation system may be configured as part of a vehicle for multiple purposes including self-driving applications, enhanced driving or user-assisted navigation, and the like. The navigation systems may be combined or integrated with positioning systems. Illustratively, the positioning systems can include processing components and data that facilitate the identification of various vehicle parameters or process information.

The local resources further include one or more processing component(s) that may be hosted on the vehicle or a computing device accessible by a vehicle (e.g., a mobile computing device). The processing component(s) can illustratively access inputs from various local sensors or sensor systems and process the inputted data and store the processed data. For purposes of the present application, the processing component(s) will be described with regard to one or more functions related to illustrative aspects. For example, processing component(s) in vehicle 110 will collect and transmit the data set corresponding to the request from authorized technicians.

The environment can further include various additional sensor components or sensing systems operable to provide information regarding various operational parameters for use in accordance with one or more of the operational states. The environment can further include one or more control components for processing outputs, such as the transmission of data through a communications output, generation of data in memory, the transmission of outputs to other processing components, and the like.

Figure 3A:
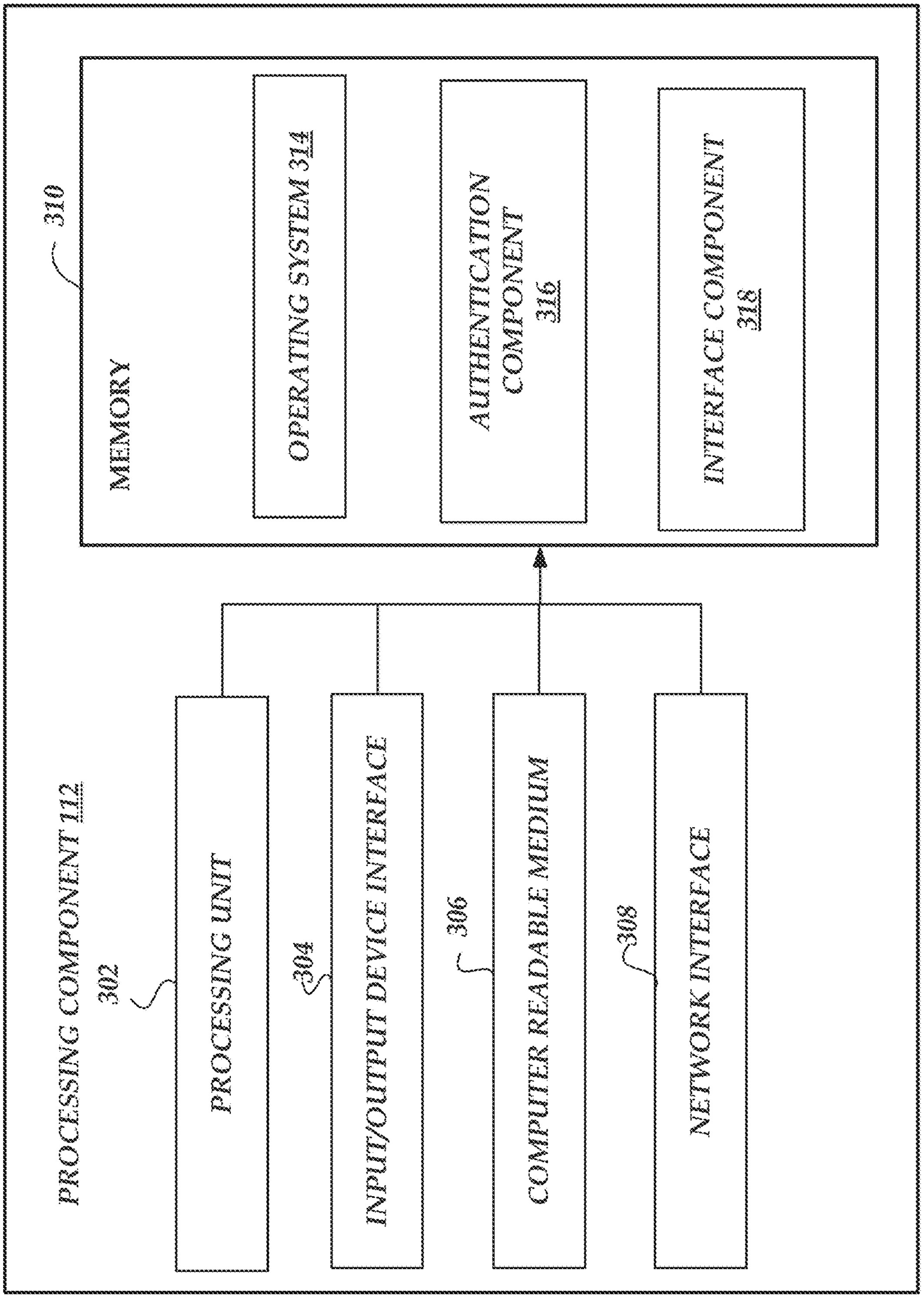
FIG. 3A depicts an illustrative architecture for implementing a processing component in accordance with aspects of the present application.

With reference now to FIG. 3A, an illustrative architecture for implementing a processing component on a vehicle 110 will be described. The processing component 112 may be part of components/systems that can provide functionality associated with processing and storing vehicle data and providing an access to the stored data for a technician by receiving the technician's authorized information.

The architecture of FIG. 3A is illustrative in nature and should not be construed as requiring any specific hardware or software configuration for the processing component. The general architecture of the processing component 112 of a vehicle/customer device depicted in FIG. 3A includes an arrangement of computer hardware and software components that may be used to implement aspects of the present disclosure. As illustrated, the processing component includes a processing unit 302, a network interface 308, a computer readable medium drive 306, and an input/output device interface 304, all of which may communicate with one another by way of a communication bus. The components of the processing component may be physical hardware components that can include one or more circuitries and software models.

The network interface 308 may provide connectivity to one or more networks or computing systems, such as the networks 150, 160 of FIG. 1. The processing unit 302 may thus receive information and instructions from other computing systems or services via a network. The processing unit 302 may also communicate to and from memory 310 and further provide output information via the input/output device interface. In some embodiments, the processing component 112 may include more (or fewer) components than those shown in FIG. 3A.

The memory 310 may include computer program instructions that the processing unit 302 executes in order to implement one or more embodiments. The memory 310 generally includes RAM, ROM, or other persistent or non-transitory memory. The memory 310 may store an operating system 312 that provides computer program instructions for use by the processing unit 302 in the general administration and operation of the processing component 112. The memory 310 may further include computer program instructions and other information for implementing aspects of the present disclosure. For example, in one embodiment, the memory 310 includes an authentication component 318. In some embodiments, the authentication component 318 requests a technician's authorized information from the vehicle data access service 112. In these embodiments, the processing component 112 may provide the technician's authentication information via the network 150. In some embodiments, a technician will have authentication credentials that are provided to the network service provider and in turn can receive a token or other semi-persistent information that indicates authentication of the technician to access the vehicle 110. In these embodiments, the technician, by utilizing the computing device 130, may provide the authenticated token or other semi-persistent information to the authentication component via the network 160. After receiving the technician's authorized information, the authentication component 316 may provide the technician's authorized information to the interface component 318.

The memory 310 further include the interface component 318. The interface software 316 can provide various interfaces to allow the authorized technician to access to the vehicle data, executable code or configurations that facilitate diagnostics or repair. In some embodiments, access to the vehicle data or data communications is set up as a set of common interfaces that do not require custom computing devices or hardware for the technicians. In one embodiment, the interfaces can correspond to vehicle network information that provides access to the values/status of sensors or components or data collected from the sensors/components of the vehicles. In some embodiments, the sensors can include hardware and software components that can obtain, generate or process a variety of operational or environment information sources that are configured in the vehicle for various purposes. In some embodiments, the sensors can provide raw, collected data to the control component as well as other controls for different functionality. By way of illustration, the information provided to control component by the sensors, controller components, or other processing units can be associated with the operation of the vehicle, such as detected vehicle speed, external temperature measurements, and operational status of the windshield wiper, vision system (e.g., camera inputs), location systems (e.g., GPS systems), timing information, operational status of the components, etc.

Figure 3B:
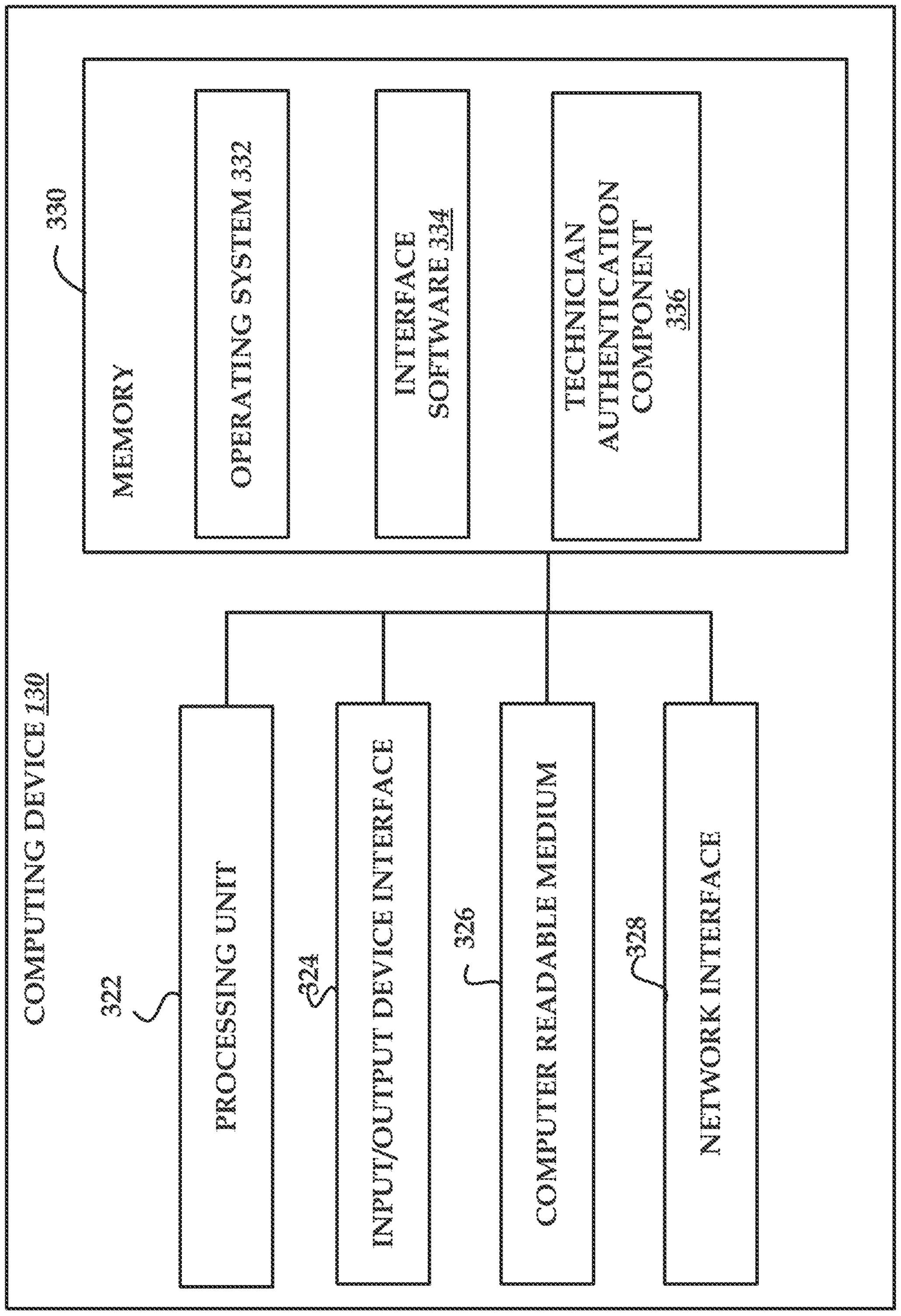
FIG. 3B depicts an illustrative architecture for implementing a computing device in accordance with aspects of the present application.

With reference now to FIG. 3B, an illustrative architecture for implementing the computing device 130/technician computing device will be described. As previously described, the computing device 130 may be part of components/systems that can provide functionality associated with a technician to provide the technician's authentication information and access to the vehicle data.

The architecture of FIG. 3B is illustrative in nature and should not be construed as requiring any specific hardware or software configuration for the computing device 130. The general architecture of the computing device 130 depicted in FIG. 3B includes an arrangement of computer hardware and software components that may be used to implement aspects of the present disclosure. As illustrated, the computing device 130 includes a processing unit 322, a network interface 328, a computer readable medium drive 326, and an input/output device interface 324, all of which may communicate with one another by way of a communication bus. The components of the computing device 130 may be physical hardware components that can include one or more circuitries and software models.

The network interface 328 may provide connectivity to one or more networks or computing systems, such as the networks 150, 160 of FIG. 1. The computing device 130 may thus receive information and instructions from other computing systems or services via a network. The computing device 130 may also communicate to and from memory 310 and further provide output information via the input/output device interface. In some embodiments, the computing device 130 may include more (or fewer) components than those shown in FIG. 3B.

The memory 330 may include computer program instructions that the processing unit 322 executes in order to implement one or more embodiments. The memory 330 generally includes RAM, ROM, or other persistent or non-transitory memory. The memory 330 may store an operating system 332 that provides computer program instructions for use by the processing unit 322 in the general administration and operation of the computing device 130.

The memory 330 may further include an interface software 334. In some embodiments, the interface software 334 provides various interfaces that can be provided to a technician. For example, the technician may receive a request from user (e.g., a vehicle owner or driver) and the request can be displayed on an interface of the computing device 130. The technician also may authenticate the technician's credential by requesting the authentication process using the interface of the computing device 130. For example, the technician may provide the credential information using the interface. In some embodiments, the interface may provide the technician's authenticated information received from the vehicle data access service 112. In these embodiments, the authenticated information can be token or other semi-persistent information that indicates authentication of the technician to access the vehicle. In some embodiments, the interface can be provided as an application programming interface.

The memory 330 may further include an authentication component 336 for managing the technician's authentication process. In some embodiments, the technician may have authentication credentials that are provided to the network service provider and in turn can receive a token or other semi-persistent information that indicates authentication of the technician to access the vehicle 110. In one example, an authenticated technician (e.g., third party) does not have access rights to any individual vehicle until the authenticated technician is authorized. In some embodiments, to request authorization, the technician submits an access request from the vehicle data access service 112, providing the following information—VIN—Customer email—Reason—Access Duration request. The transmission of the request can be facilitated through the interface software 334 such as an API or other interfaces. In some embodiments, the access request can be pre-populated with profile information that defines default information, such as access duration, or specified limitations to data access rights (e.g., vehicle logs pertaining to specific components or excluding other components).

Figure 3C:
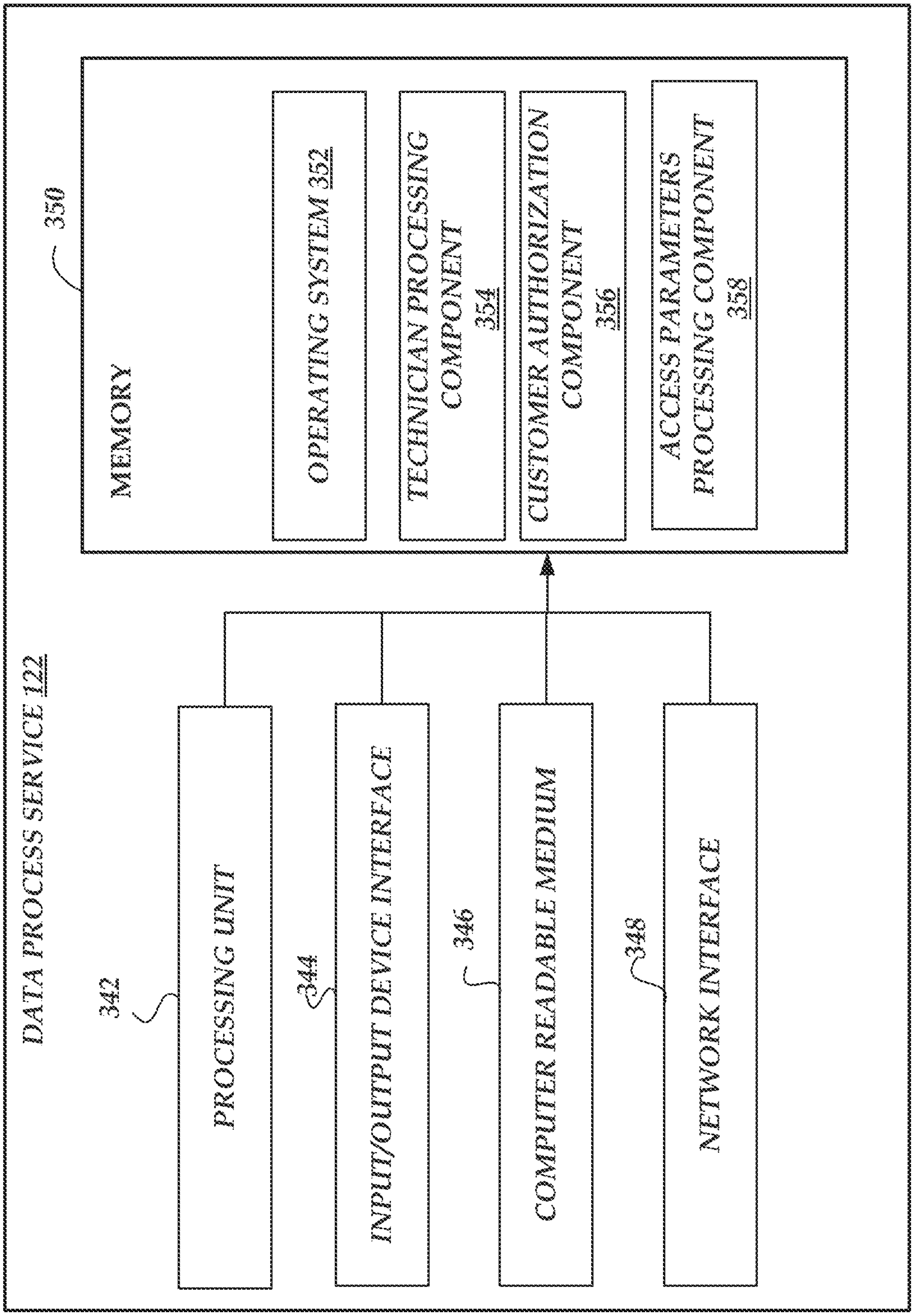
FIG. 3C depicts an illustrative architecture for implementing an authentication service in accordance with aspects of the present application.

With reference now to FIG. 3C, an illustrative architecture for implementing the vehicle data access service 122 on a network service provider 120 will be described. The vehicle data access service 122 may be part of components/systems that can provide functionality associated with a technician to authenticate the technician's authentication information and provide an authorized information to the technician via the computing device 130.

The architecture of FIG. 3C is illustrative in nature and should not be construed as requiring any specific hardware or software configuration for the authentication service 122. The general architecture of the authentication service 122 depicted in FIG. 3C includes an arrangement of computer hardware and software components that may be used to implement aspects of the present disclosure. As illustrated, the authentication service 122 includes a processing unit 342, a network interface 348, a computer readable medium drive 346, and an input/output device interface 344, all of which may communicate with one another by way of a communication bus. The components of the authentication service 122 may be physical hardware components that can include one or more circuitries and software models.

The network interface 348 may provide connectivity to one or more networks or computing systems, such as the networks 150, 160 of FIG. 1. The computing device 130 may thus receive information and instructions from other computing systems or services via a network. The authentication service 122 may also communicate to and from memory 350 and further provide output information via the input/output device interface. In some embodiments, the authentication service 122 may include more (or fewer) components than those shown in FIG. 3B.

The memory 350 may include computer program instructions that the processing unit 342 executes in order to implement one or more embodiments. The memory 350 generally includes RAM, ROM, or other persistent or non-transitory memory. The memory 350 may store an operating system 354 that provides computer program instructions for use by the processing unit 342 in the general administration and operation of the authentication service 122.

The memory 350 may further include a technician authorization component for authenticating technicians submitting data access requests and validating received requests. In some embodiments, the user authentication component 354 receives a technician's authentication information (e.g., credential information) from the technician. In some embodiments, the user authentication component 354 receives a technician token to ensure that the authentication rights permit access to the requested vehicle and vehicle data access type. For example, the user authentication component 354 can verify that the technician has a valid subscription and that the subscription/qualifications of the technician. For example, the user authentication component 354 can verify that the requesting technician has sufficient credentials to provide the requested service to the vehicle. In another example, the user authentication component 354 can also determine whether the requested service/access by the technician corresponds to a type of service that should be performed on the vehicle and whether the requested service is not duplicative or redundant. In still a further example, the user authentication component 354 can also determine whether the requested service is characteristic of a pattern of behavior for the identified technician (e.g., service associated with different vehicles) that can be characterized as appropriate, potentially harmful, requiring verification from the customer or the like. The user authentication component 354 can also verify aspects of the requested vehicle, the devices utilized by the technician, the like.

The memory 350 can further include a customer authorization component 356 for interfacing with customer to identify technicians, receive authorization information, parse or identify access parameters and generate notifications to customer devices 110. The memory further includes an access parameter processing component 358 for determining access parameters for vehicle data based on received authorization information, default information associated with authenticated technicians, customer profiles/preferences and any combination or variation thereof.

Figure 4:
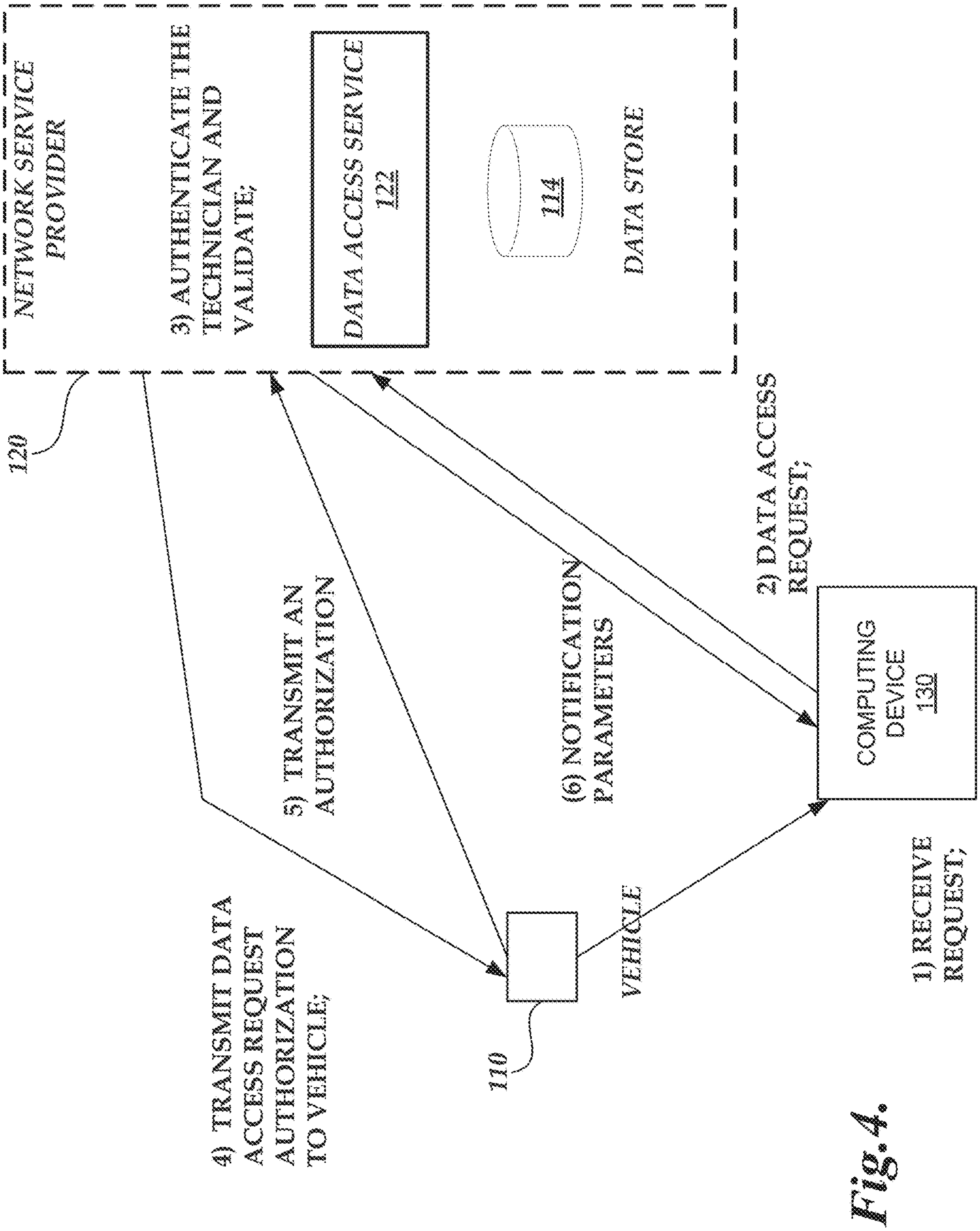
FIG. 4 is block diagrams of the illustrative environment of FIG. 1.

FIG. 4 is a block diagram of the illustrative environment of FIG. 1. FIG. 4 depicts an illustrative interaction between a customer, authorized service technician, and network service provider. The overall high-level flow is illustrated as follows: In some examples, a customer determines that it would like to have a vehicle serviced and provides VIN and contact information or identifiers. The vehicle 110 may include interfaces that identify the service options, and identifies one or more technicians that may be available for service. The identified technicians may include an organization (e.g., a particular service dealer) and does not necessary require an individual technician. The Customer may transmit the request or information utilizing interfaces in the vehicle, a mobile device (e.g., a mobile application) or an additional computing device (e.g., a kiosk, laptop, tablet, etc.).

At (1), a technician, e.g., utilizing the computing device 130, receives the request and authenticates with the network service provider. Illustratively, a technician will have authentication credentials that are provided to the network service provider and in turn can receive a token or other semi-persistent information that indicates authentication of the technician to access the network service. In one example, a authenticated technician (e.g., third party) does not have access rights to any individual vehicle until the authenticated technician is authorized, as illustrated below. To request authorization, the technician submits an access request from the network service, providing the following information—VIN—Customer email—Reason—Access Duration request. The transmission of the request can be facilitated through an API or other interface. In some embodiments, the access request can be pre-populated with profile information that defines default information, such as access duration, or specified limitations to data access rights (e.g., vehicle logs pertaining to specific components or excluding other components).

At (2), the network service provider 120 receives the data access request and validates that technician token to ensure that the authentication rights permit access to the requested vehicle and vehicle data access type. At (3), the network service provider 120 can also verify that the VIN is owned by the Customer or and that the Customer contact information/identifier is valid.

Figure 8:
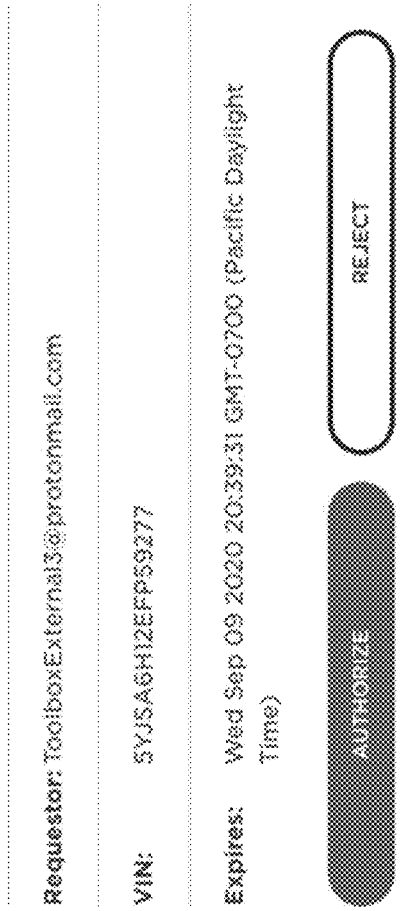
FIGS. 8-10 are block diagrams of illustrative interfaces.
Figure 9A:
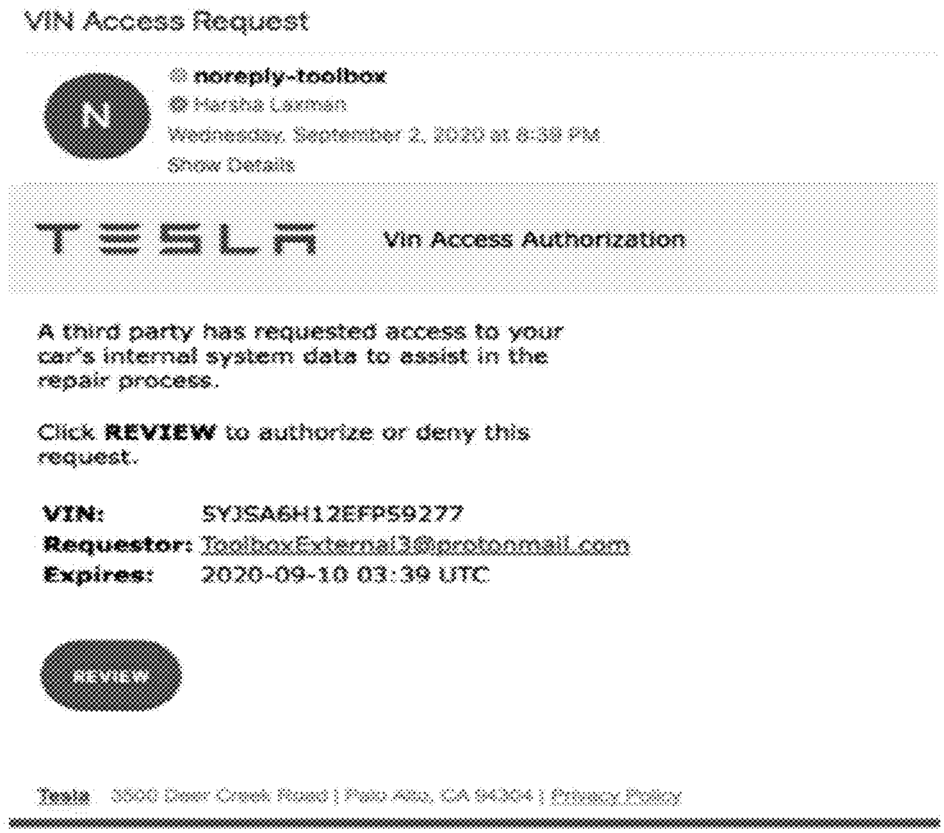
Figure 10:
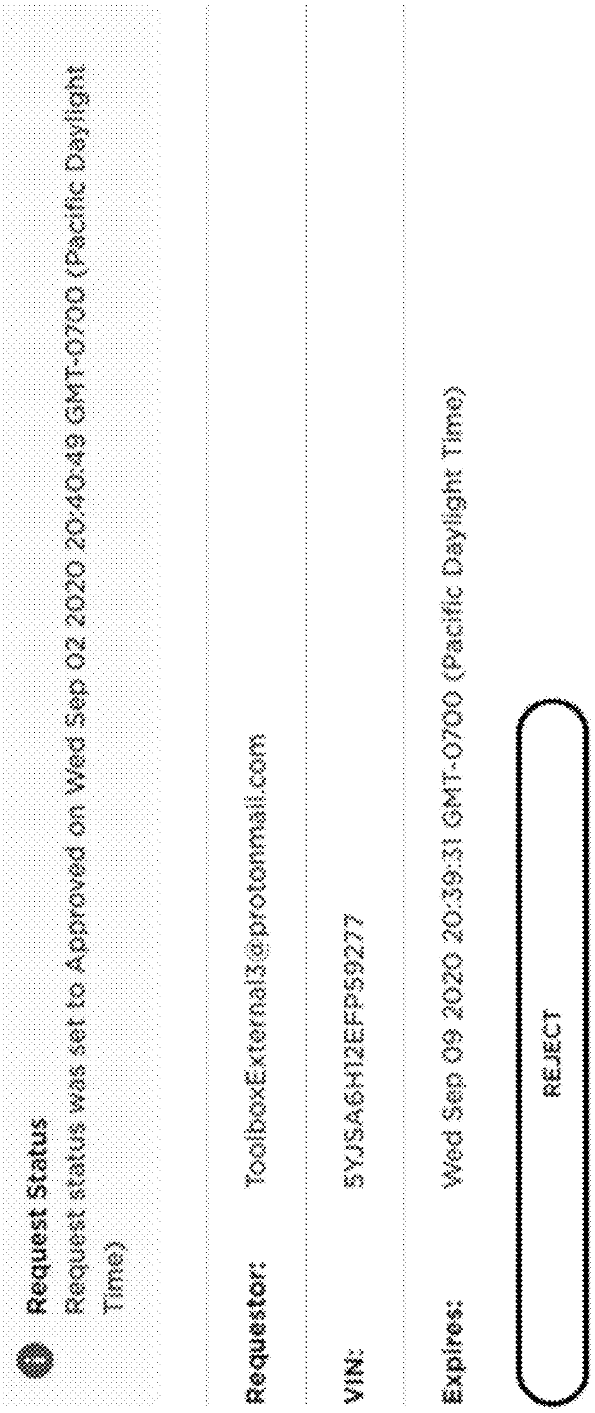

At (4) The network service provider 120 transmits a request or notification to the Customer indicating that data access communications have been requested and prompting the Customer for a response. FIG. 8 and FIG. 9A illustrate various embodiments of interfaces in which a Customer may be notified of a requested access and prompting for a decision regarding authorization (e.g., accept or reject). The notifications may be provided via various communication channels including email, short message service, mobile application, in-vehicle, and the like. In some embodiments, the Customer may also be prompted to provide additional authorization parameters including, but not limited, duration of access, types of data accessed, revoking criteria (e.g., criteria that will result in an automatic revoking of rights), customer notification parameters, and the like. In some embodiments, the network service can be configured with customer profile that may specify default values for the authorization parameters. FIG. 10 illustrates an example of vehicle data access request status, including the parameters such as expiration time data.

Figure 9B:
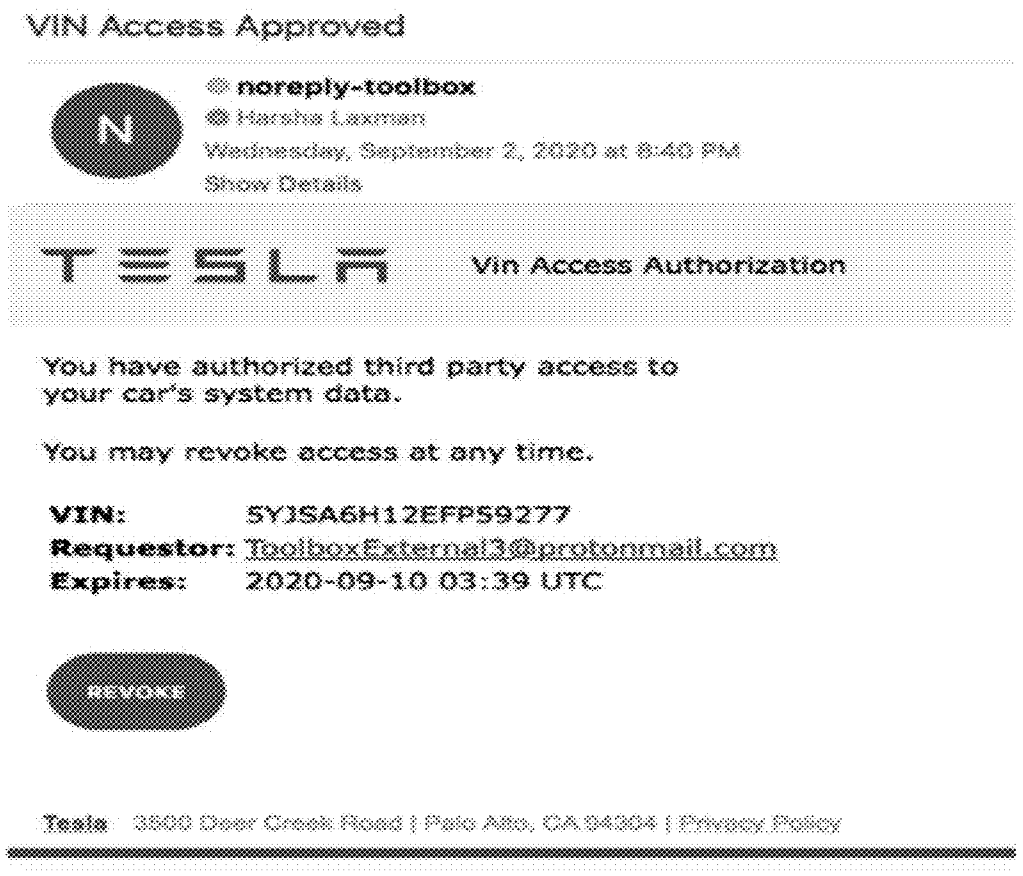
Figure 9C:
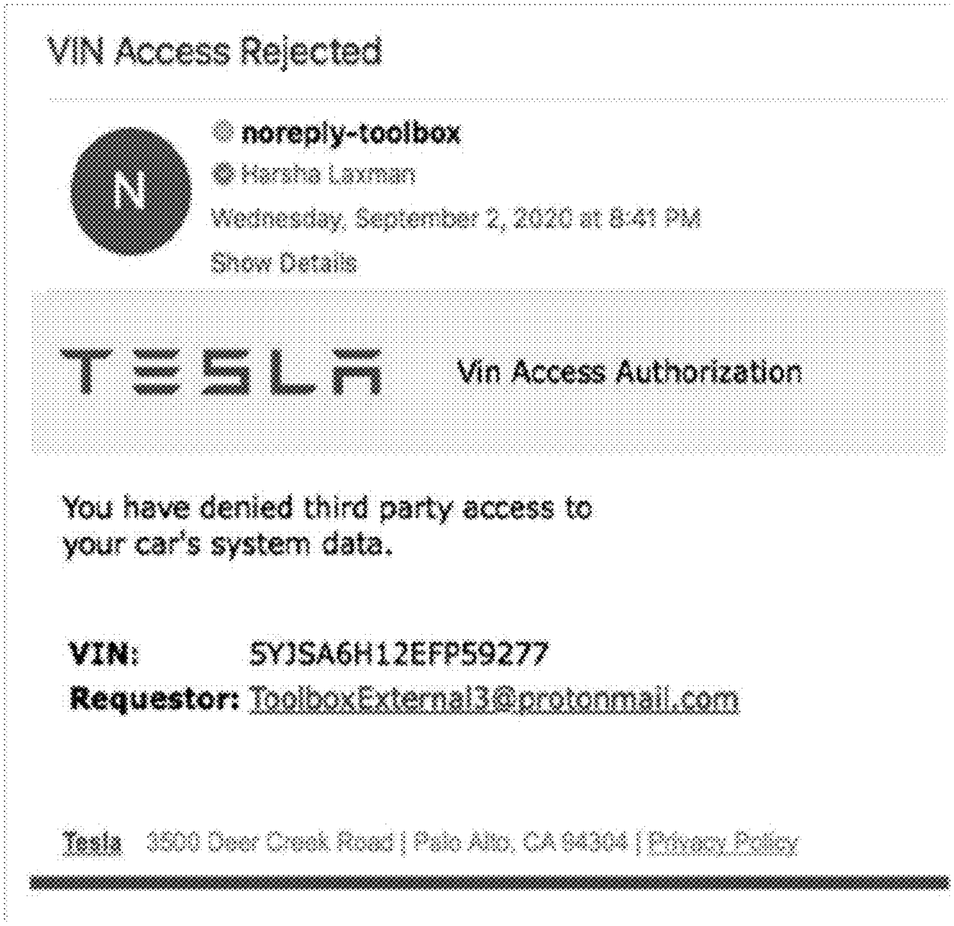

At (5), the vehicle transmits an authorization to the network service provider 120. If customer approves, technician receives a notification that the customer has approved. The notification can include authorization parameters. At (6), the network service provider 120 can also provide notification/confirmation to the customer regarding the authorization, such as illustrated in FIGS. 9B and 9C.

In some examples, the network service provider 120 can store the VIN, access expiration, and Technician account that has been granted access. The technician can then illustratively transmit requests to the network service to establish data communications with the identified vehicle. As described above, the data access can include accessing vehicle data collected by the vehicle. As described above, the sensors can include hardware and software components that can obtain, generate or process a variety of operational or environment information sources that are configured in the vehicle for various purposes. In some embodiments, the sensors can provide raw, collected data to the control component as well as other controls for different functionality. By way of illustration, the information provided to control component by the sensors, controller components, or other processing units can be associated with the operation of the vehicle, such as detected vehicle speed, external temperature measurements, and operational status of the windshield wiper, vision system (e.g., camera inputs), location systems (e.g., GPS systems), timing information, operational status of the components, etc. In other examples, the technician can transmit executable code or configuration information or cause pre-loaded executable code or configuration to be executed for purposes of completing the requested service. As described previously, during the interaction, the customer may transmit additional commands to the network service indicating a revocation of the authorization rights. Responsive to the receipt of the revocation, the network service can update the access rights of the technician, provide notifications and reject all subsequent requests (or various combinations/variations thereof). Additionally, the network service provider can implement subsequent authentication protocols with the Technician that requires a frequency of authentication independent of the duration of the authorization.

Figure 5:
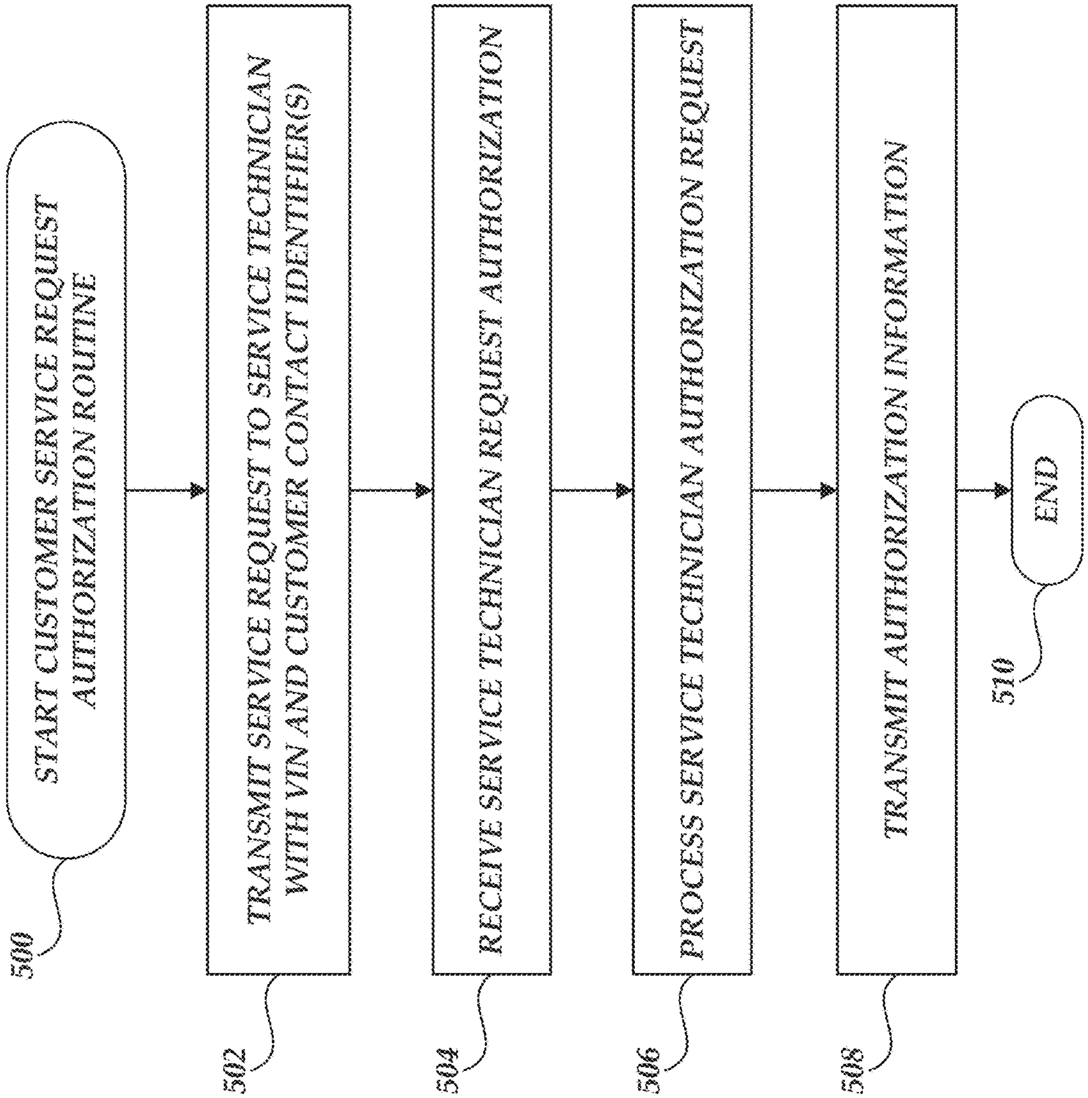
FIG. 5 is a flow chart describing a routine for accessing a vehicle data according one or more embodiments.
Figure 6:
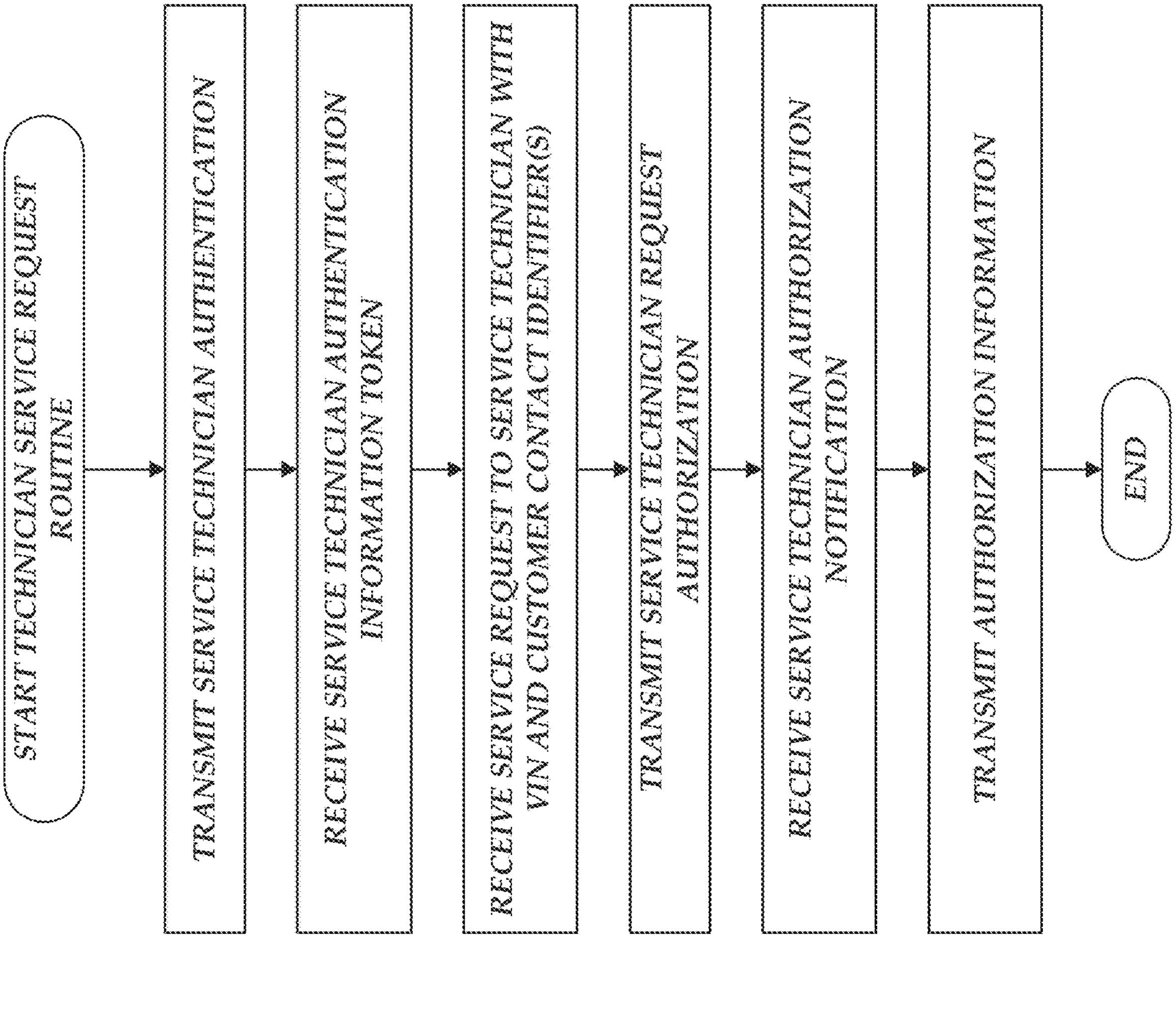
FIG. 6 is a flow chart describing a routine for accessing a vehicle data according one or more embodiments.
Figure 7:
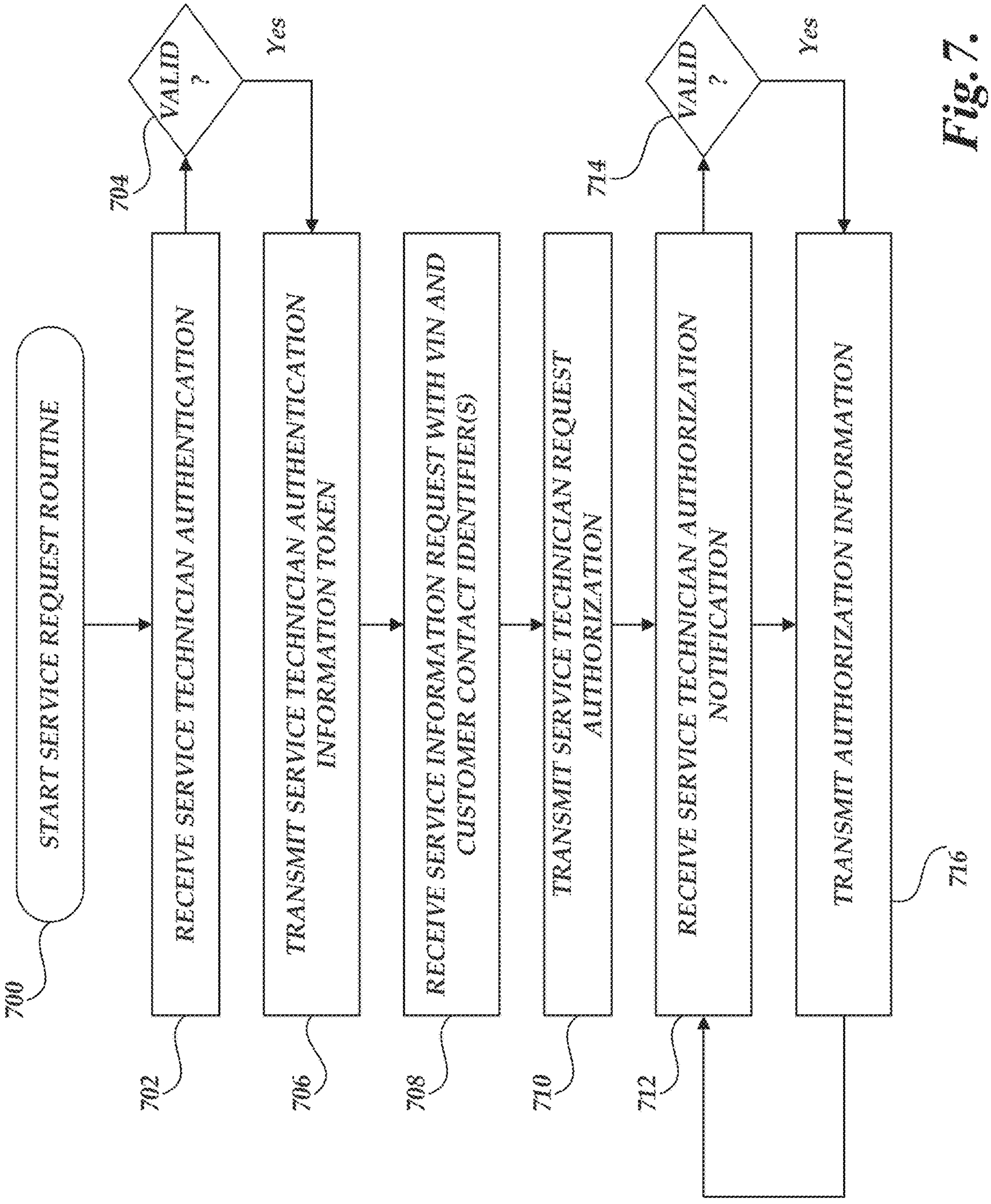
FIG. 7 is a flow chart describing a routine for accessing a vehicle data according one or more embodiments.

FIG. 5 illustrates a follow diagram of illustrative interaction of a customer service request processing routine implemented by a customer as described herein. FIG. 6 illustrates a flow diagram of illustrative interaction of a third party technician request processing routine implemented by a Technician as described herein. FIG. 7 illustrates a flow diagram of illustrative interaction of a service request processing routine implemented by a network service provider as described herein. One skilled in the relevant art will appreciate that the routines may be implemented by one or more computing devices implementing appropriate hardware and software executable codes and modules to provide the identified functionality.

The foregoing disclosure is not intended to limit the present disclosure to the precise forms or particular fields of use disclosed. As such, it is contemplated that various alternate embodiments and/or modifications to the present disclosure, whether explicitly described or implied herein, are possible in light of the disclosure. Having thus described embodiments of the present disclosure, a person of ordinary skill in the art will recognize that changes may be made in form and detail without departing from the scope of the present disclosure. Thus, the present disclosure is limited only by the claims.

In the foregoing specification, the disclosure has been described with reference to specific embodiments. However, as one skilled in the art will appreciate, various embodiments disclosed herein can be modified or otherwise implemented in various other ways without departing from the spirit and scope of the disclosure. Accordingly, this description is to be considered as illustrative and is for the purpose of teaching those skilled in the art the manner of making and using various embodiments of the disclosed air vent assembly. It is to be understood that the forms of disclosure herein shown and described are to be taken as representative embodiments. Equivalent elements, materials, processes, or steps may be substituted for those representatively illustrated and described herein. Moreover, certain features of the disclosure may be utilized independently of the use of other features, all as would be apparent to one skilled in the art after having the benefit of this description of the disclosure. Expressions such as "including", "comprising", "incorporating", "consisting of", "have", "is" used to describe and claim the present disclosure are intended to be construed in a non-exclusive manner, namely allowing for items, components or elements not explicitly described also to be present. Reference to the singular is also to be construed to relate to the plural.

Further, various embodiments disclosed herein are to be taken in the illustrative and explanatory sense, and should in no way be construed as limiting of the present disclosure. All joinder references (e.g., attached, affixed, coupled, connected, and the like) are only used to aid the reader's understanding of the present disclosure, and may not create limitations, particularly as to the position, orientation, or use of the systems and/or methods disclosed herein. Therefore, joinder references, if any, are to be construed broadly. Moreover, such joinder references do not necessarily infer that two elements are directly connected to each other.

Additionally, all numerical terms, such as, but not limited to, "first", "second", "third", "primary", "secondary", "main" or any other ordinary and/or numerical terms, should also be taken only as identifiers, to assist the reader's understanding of the various elements, embodiments, variations and/or modifications of the present disclosure, and may not create any limitations, particularly as to the order, or preference, of any element, embodiment, variation and/or modification relative to, or over, another element, embodiment, variation and/or modification.

It will also be appreciated that one or more of the elements depicted in the drawings/figures can also be implemented in a more separated or integrated manner, or even removed or rendered as inoperable in certain cases, as is useful in accordance with a particular application.

What is claimed:

1. A system for providing vehicle data access, the system comprising:

one or more external computing devices comprising a processor and a memory for executing computer-executable instructions that implement a vehicle data service, wherein the vehicle data service is configured to:

obtain, from a technician computing device, a vehicle data access service request via an application programming interface (API), the vehicle data access service request including a pre-authorization token authenticating the technician computing device, wherein the vehicle data access service request is transmitted in response to a received customer request by a technician, and wherein the received customer request includes an identifier of a vehicle associated with a customer;

validate the obtained vehicle data access service request based on the pre-authorization token and the received customer request to ensure an authenticated right, by the technician, to access vehicle data for performing the received customer request;

transmit, to a customer computing device of the customer via the API, an authorization request for vehicle data access corresponding to the validated vehicle data access service request;

receive, from the customer computing device via the API, authorization parameters responsive to the transmitted authorization request, wherein the authorization parameters include one or more vehicle data access parameters comprising a first parameter defining a duration of access, and wherein at least one of the one or more vehicle data access parameters is user defined;

transmit to the technician computing device, a notification responsive to the obtained vehicle data access service request;

establish data communication between the technician computing device and the vehicle associated with the customer computing device, the data communication configured to allow the technician computing device to access the vehicle data; and independent to the duration of access, conduct one or more subsequent authentication protocols with the technician computing device.

2. The system as recited in claim 1, wherein the vehicle data service is further operative to transmit the received customer request to the technician computing device based on input from the customer.

3. The system as recited in claim 2, wherein the received customer request is based on selection of inputs via an interface provided to the customer computing device.

4. The system as recited in claim 1, wherein the vehicle data access service request is responsive to a direct communication between the technician computing device and the customer computing device.

5. The system as recited in claim 1, wherein the vehicle data service obtains the one or more vehicle data access parameters from a customer profile.

6. The system as recited in claim 1, wherein the one or more vehicle data access parameters further comprise at least one revocation parameter related to vehicle data access by the technician computing device.

7. The system as recited in claim 6, wherein the vehicle data service is further operative to evaluate the at least one revocation parameter and cause cessation of the vehicle data access.

8. The system as recited in claim 1, wherein the customer computing device corresponds to a computing device integrated in the vehicle.

9. The system as recited in claim 1, wherein the customer computing device corresponds to a stand-alone computing device in communication with the vehicle.

10. A system for providing vehicle data access, the system comprising:

one or more external computing devices comprising a processor and a memory for executing computer-executable instructions to that implement a vehicle data service, wherein the vehicle data service is configured to:

obtain, from a technician computing device, a vehicle data access service request, the vehicle data access service request including an authorization token authenticating the technician computing device, wherein the vehicle data access service request is transmitted in response to a received customer request by a technician, and wherein the received customer request includes an identifier of a vehicle associated with a customer;

validate the obtained vehicle data access service request received from the technician computing device based on the authorization token to ensure an authenticated right, by the technician, to access vehicle data for performing the received customer request;

responsive to validating the obtained vehicle data access service request, transmit, to a customer computing device of the customer, an authorization request for vehicle data access;

receive, from the customer computing device, authorization parameters responsive to the transmitted authorization request, wherein the authorization parameters include one or more vehicle data access parameters comprising a first parameter defining a duration of access, and wherein at least one of the one or more data vehicle access parameters is user defined;

transmit to the technician computing device, a notification responsive to the obtained vehicle data access service request, wherein the notification includes the authorization parameters;

establish data communication between the technician computing device and the vehicle associated with the customer computing device, the data communication configured to allow the technician computing device to access the vehicle data, wherein the vehicle data is collected by the vehicle; and independent to the duration of access, conduct one or more subsequent authentication protocols with the technician computing device.

11. The system as recited in claim 10, wherein the vehicle data service is further operative to transmit an additional customer request to the technician computing device based on input from a customer.

12. The system as recited in claim 10, wherein receiving the authorization token is responsive to a direct communication between the technician computing device and the customer computing device.

13. The system as recited in claim 10, wherein the vehicle data service identifies the one or more vehicle data access parameters from a customer profile.

14. The system as recited in claim 10, wherein the one or more vehicle data access parameters further comprise a revocation parameter related to vehicle data access by the technician computing device.

15. A method for providing vehicle data access, the method comprising;

obtain, from a technician computing device, a vehicle data access service request, the vehicle data access service request including an authorization token authenticating the technician computing device, wherein the vehicle data access service request is transmitted in response to a received customer request by a technician, and wherein the received customer request includes an identifier of a vehicle associated with a customer;

validating, by a vehicle data access service, the obtained vehicle data access request received from the technician computing device based on the authorization token to ensure an authenticated right, by the technician, to access vehicle data for performing the received customer request;

responsive to validating the obtained vehicle data access service request, transmitting, to a customer computing device of the customer, an authorization request for vehicle data access;

receiving, from the customer computing device, authorization parameters responsive to the transmitted authorization request, wherein the authorization parameters include one or more vehicle data access parameters comprising a first parameter defining a duration of access, and wherein at least one of the one or more vehicle data access parameters is user defined;

transmitting to the technician computing device, a notification responsive to the obtained vehicle data access service request, wherein the notification includes the authorization parameters;

establishing, by the vehicle data access service, data communication between the technician computing device and the vehicle associated with the customer computing device, the data communication configured to allow the technician computing device to access the vehicle data, wherein the vehicle data is collected by the vehicle; and independent to the duration of access, conducting one or more subsequent authentication protocols with the technician computing device.

16. The method as recited in claim 15, wherein the one or more vehicle data access parameters further comprise at least one revocation parameter related to vehicle data access by the technician computing device.

17. The method as recited in claim 15, further comprising receiving a customer request, wherein the customer request identifies the vehicle data to be accessed by the technician computing device.

* * * * *